US012430066B2

(12) United States Patent
Inbar et al.

(10) Patent No.: US 12,430,066 B2
(45) Date of Patent: Sep. 30, 2025

(54) DYNAMIC CONTROLLER BUFFER MANAGEMENT AND CONFIGURATION

(71) Applicant: Sandisk Technologies, Inc., Milpitas, CA (US)

(72) Inventors: Karin Inbar, Ramat Hasharon (IL); Noga Deshe, Raanana (IL)

(73) Assignee: Sandisk Technologies, Inc., Milpitas, CA (US)

( * ) Notice: Subject to any disclaimer, the term of this patent is extended or adjusted under 35 U.S.C. 154(b) by 955 days.

(21) Appl. No.: 17/520,936

(22) Filed: Nov. 8, 2021

(65) Prior Publication Data

US 2023/0143926 A1    May 11, 2023

(51) Int. Cl.
*G06F 3/06*    (2006.01)

(52) U.S. Cl.
CPC .......... *G06F 3/0656* (2013.01); *G06F 3/0604* (2013.01); *G06F 3/0644* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,128,845 B2 | 9/2015 | Chang et al. | |
| 9,229,876 B2 | 1/2016 | Slepon | |
| 9,734,066 B1 | 8/2017 | Indupuru et al. | |
| 10,409,726 B2 | 9/2019 | Jean | |
| 2008/0177975 A1 | 7/2008 | Kawamura | |
| 2014/0019707 A1* | 1/2014 | Benhase | G06F 13/385 |
| | | | 711/171 |
| 2018/0292991 A1 | 10/2018 | Walker | |
| 2020/0218605 A1 | 7/2020 | Subramanian et al. | |
| 2021/0064274 A1 | 3/2021 | Lee | |
| 2021/0133111 A1 | 5/2021 | Lee et al. | |
| 2022/0083500 A1* | 3/2022 | Tsai | G06F 15/7867 |

OTHER PUBLICATIONS

International Search Report and Written Opinion for International Application No. PCT/US2022/029340 dated Oct. 7, 2022.
You Zhou et al., Score: A Novel Scheme to Efficiently Cache Overlong ECCs in NAND Flash Memory, ACM Transactions on Architecture and Code Optimization, vol. 15, No. 4, Article 60. Publication date: Dec. 2018, 25 pages.
Hui Sun et al., Co-Active: A Workload-Aware Collaborative Cache Management Scheme for NVMe SSDs, 2021 IEEE, 15 pages.

* cited by examiner

*Primary Examiner* — Brian R Peugh
(74) *Attorney, Agent, or Firm* — Patterson + Sheridan, LLP (57) ABSTRACT

A method and apparatus for dynamic controller buffer management is disclosed. According to certain embodiments, responsive to commands received from a host, a controller may adjust one or more partitions of a controller buffer memory to adjust the size of different types of buffer memory. In some embodiments, preset buffer memory configurations may be applied to the buffer memory to adjust buffer memory allocation based on the current workload. By way of example, when sequential reads are detected, a TRAM buffer size may be increased to provide additional RLA buffers, at the expense of XRAM and/or L2P buffer size. Where operations involving SLC memory is detected, allocation of buffer memory parity buffers of XRAM may be decreased, to provide additional buffer space to L2P.

20 Claims, 8 Drawing Sheets

```
Identify a workload
characteristic of a workload
of the data storage device
804
          │
          ▼
Modify the first buffer size
based on the workload
characteristic
808
          │
          ▼
Modify the second buffer
size based on the
modification of the first
buffer size
812
```

FIG. 8

DYNAMIC CONTROLLER BUFFER MANAGEMENT AND CONFIGURATION

BACKGROUND OF THE DISCLOSURE

Field of the Disclosure

Embodiments of the present disclosure generally relate to a controller for a data storage device, and more particularly to managing buffer memory in the controller.

Background of the Invention

One aspect of optimizing performance of a data storage device (DSD) is providing fast buffer memory in a controller of the storage device. According to certain embodiments, this buffer memory may be an SRAM, or in some cases, a DRAM, and other memory types are useful for this purpose. Conventionally, this buffer memory may include a number of static partitions that are used during operations. A transactional random access memory (TRAM) partitions contains buffers that are used for host write operations and relocations, as well as read-look ahead (RLA) buffers that are used for optimization of sequential read operations. A buffer for holding parity accumulated from different pages for each open block on the DSD is referred to herein as XRAM. Parity in this context is used to recover data in the event of read errors and defects in one or more storage cells of a non-volatile (NVM) memory device of the DSD, such as a NAND. A logical to physical (L2P) cache is a third type of buffer of the buffer memory that stores portions of a L2P table, for use in DSD operations.

Conventionally, controller buffer partitions are kept at static sizes.

Accordingly, what is needed are systems and methods to improve usage of the controller memory buffer.

SUMMARY OF THE DISCLOSURE

The present disclosure generally relates to a method and apparatus for dynamic controller buffer management. According to certain embodiments, responsive to commands received from a host, a controller may adjust one or more partitions of a controller buffer memory to adjust the size of different types of buffer memory. In some embodiments, preset buffer memory configurations are applied to the buffer memory to adjust buffer memory allocation based on the current workload. By way of example, when sequential reads are detected, a TRAM buffer size may be increased to provide additional RLA buffers, at the expense of XRAM and/or L2P buffer size. Where operations involving SLC memory is detected, allocation of buffer memory parity buffers of XRAM may be decreased, to provide additional buffer space to L2P.

In one embodiment, a data storage device is disclosed that includes a non-volatile memory (NVM) device, and a controller coupled to the NVM device. The controller includes a buffer memory device comprising a first buffer partition consisting of one of a transactional RAM (TRAM) buffer, a logical to physical (L2P) buffer, or a parity RAM (XRAM) buffer, the first buffer partition being of a first buffer size, and a second buffer partition consisting of one of a transactional RAM (TRAM) buffer, a logical to physical (L2P) buffer, or a parity RAM (XRAM) buffer that is different from the first buffer partition, the of a second buffer partition being of a second buffer size, and a processor coupled to the buffer memory device. The processor is configured to identify a workload characteristic of a workload of the data storage device, modify the first buffer size based on the workload characteristic, and modify the second buffer size based on the modification of the first buffer size.

In another embodiment, a controller for a data storage device is disclosed that includes a buffer memory device consisting of a first buffer partition comprising one of a transactional RAM (TRAM) buffer, a logical to physical (L2P) buffer, or a parity RAM (XRAM) buffer, the first buffer partition being of a first buffer size, and a second buffer partition consisting of one of a transactional RAM (TRAM) buffer, a logical to physical (L2P) buffer, or a parity RAM (XRAM) buffer that is different from the first buffer partition, the of a second buffer partition being of a second buffer size, the first buffer size and second buffer size allocated based on a first workload, and a buffer management module (BMG) coupled to the buffer memory, configured to adjust the first buffer size and second buffer size based on a workload of the data storage device.

In another embodiment, a data storage device is disclosed that includes one or more non-volatile memory (NVM) means, and a controller means comprising computer-readable instructions. The computer-readable instructions cause the controller means to identify a workload characteristic of a workload of the data storage device, and remove a first data type from a first buffer partition of a buffer memory means based on the workload characteristic. The computer-readable instructions further cause the controller means to modify the first buffer size, and modify a second buffer size of a second buffer partition of the buffer memory means, based on the modification of the first buffer size.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered an element or limitation of the appended claims except where explicitly recited in a claim(s).

The present disclosure generally relates to methods and systems for dynamic controller buffer management. According to certain embodiments, responsive to commands received from a host, a controller may adjust one or more partitions of a controller buffer memory to adjust the size of different types of buffer memory. In some embodiments, preset buffer memory configurations may be applied to the buffer memory to adjust buffer memory allocation based on the current workload. By way of example, when sequential reads are detected, a TRAM buffer size may be increased to provide additional RLA buffers, at the expense of XRAM and/or L2P buffer size. Where operations involving SLC memory is detected, allocation of buffer memory parity buffers of XRAM may be decreased, to provide additional buffer space to L2P.

Example System

Figure 1:
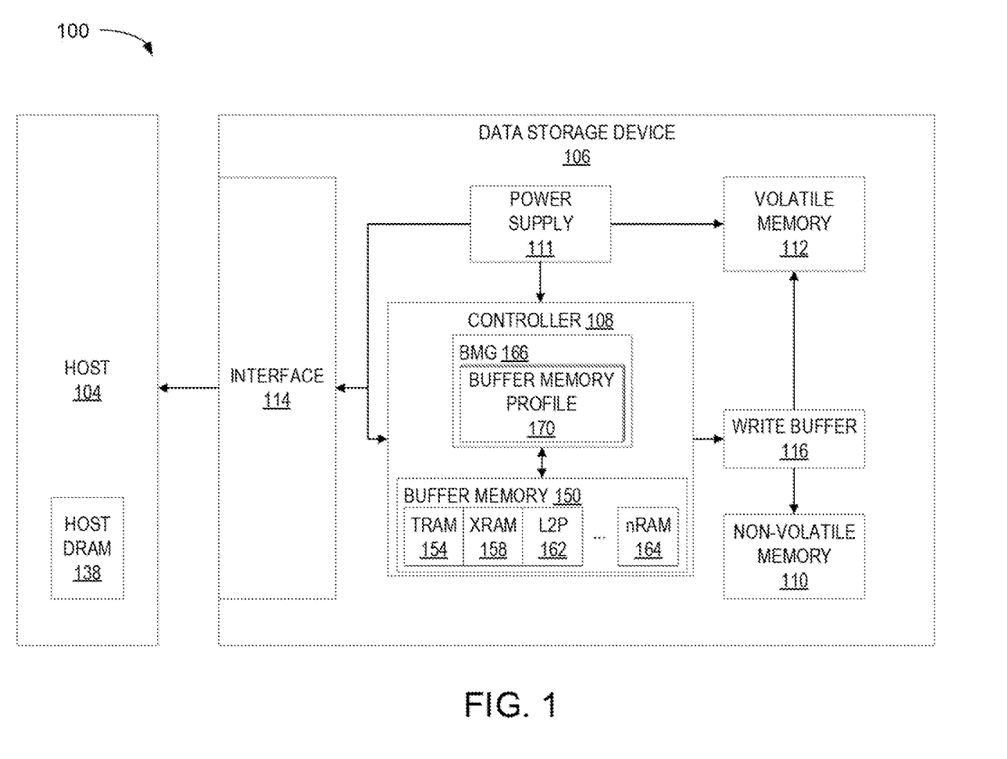
FIG. 1 is a schematic block diagram illustrating a storage system, according to certain embodiments.

FIG. 1 is a schematic block diagram illustrating a storage system 100 in which a host device 104 is in communication with a data storage device (DSD) 106, according to certain embodiments. For instance, the host device 104 may utilize a non-volatile memory (NVM) 110 included in DSD 106 to store and retrieve data. The host device 104 comprises a host DRAM 138. In some examples, the storage system 100 may include a plurality of storage devices, such as the DSD 106, which may operate as a storage array. For instance, the storage system 100 may include a plurality of DSD 106 configured as a redundant array of inexpensive/independent disks (RAID) that collectively function as a mass storage device for the host device 104.

The host device 104 may store and/or retrieve data to and/or from one or more storage devices, such as the DSD 106. As illustrated in FIG. 1, the host device 104 may communicate with the DSD 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The DSD 106 includes a controller 108, NVM 110, a power supply 111, volatile memory 112, the interface 114, and a write buffer 116. In some examples, the DSD 106 may include additional components not shown in FIG. 1 for the sake of clarity. For example, the DSD 106 may include a printed circuit board (PCB) to which components of the DSD 106 are mechanically attached and which includes electrically conductive traces that electrically interconnect components of the DSD 106 or the like. In some examples, the physical dimensions and connector configurations of the DSD 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the DSD 106 may be directly coupled (e.g., directly soldered or plugged into a connector) to a motherboard of the host device 104, or may be located remotely from the host device 104 and accessed via a network or bus (e.g., PCIe) via interface 114.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the DSD 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and from NVM flash memory devices at the page level and erase data from NVM flash memory devices at the block level.

The power supply 111 may provide power to one or more components of the DSD 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in an idle or shutdown mode, such as where power ceases to be received from the external device, or is received at a lower rate. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information such as command queues, error correction code (ECC) data, and other data that may be utilized by the controller 108 during operation of the DSD 106. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the DSD 106. For instance, controller 108 may manage the reading of data from and/or the writing of data to the NVM 110. In some embodiments, when the DSD 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the DSD 106 receives a write command from the host device 104, the controller 108 temporarily stores the data associated with the write command in the internal memory or write buffer 116 before sending the data to the NVM 110. Controller 108 includes a buffer memory 150 that includes a transactional RAM buffer (TRAM) 154, a parity RAM buffer (XRAM) 158, and a logical to physical cache (L2P) 162. TRAM 154 are holding buffers used for host write operations and relocation operations. According to certain embodiments, buffer memory 150, and accordingly its components, may be implemented with a RAM, SRAM, DRAM, SDRAM or other physical memory architecture. Although shown as three components, according to certain embodiments buffer memory 150 is a contiguous physical memory space that may be allocated, or adjusted, as described herein. According to certain embodiments, buffer memory 150 may include more than three buffers, and up to any number of buffers, as indicated by nRAM 164. By way of example and not limitation, additional buffers may include one or more management tables such as a grown bad block list, management tables associated with a host memory buffer (HMB) such as host DRAM 138, management tables for circuit bonded array (CBA) operations, as well as additional TRAM, XRAM, and/or L2P buffers.

According to certain embodiments, TRAM 154 is managed in buffers sized in 4 KB increments; other embodiments may use different sizes. When host device 104 seeks to write data from host DRAM 138 the data may first be written to TRAM 154 before being written to the NVM 110. Regarding relocation, when data is to be relocated, such as for garbage collection operations, data is copied from a block of the NVM 110 to TRAM 154, and then to another block in the NVM 110. TRAM 154 may further be utilized for read-look-ahead (RLA) operations. When the controller detects that the current workload from the host device 104 is in a sequential read mode, TRAM 154 may serve as a read look ahead buffer for reading sequential blocks from the NVM in order to improve RLA operations. According to certain embodiments, a controller may detect that the current workload is a sequential read by analyzing a threshold number of received commands that are determined to be reads on the NVM 110 from sequential locations, e,g., sequential logic addresses (LBAs).

XRAM 158 is configured to hold parity data accumulated for different pages of each open block of the NVM 110. The parity data is used to recover data, for example, that has been modified as a result of a NAND defect in the NVM 110. XRAM 158 is typically limited in size, and it is common that parity data may be swapped into/out of the NVM 110 by firmware.

L2P 162 is a buffer space for storing parts of a logical to physical table, mapping logical location references to physical locations on the NVM 110.

As described herein, the relative sizes of the TRAM 154, XRAM 158, and L2P 162, and in some embodiments, additional buffers such as up to nRAM 164, may be changed depending on the workload of the DSD 106 as detected by the controller 108. Buffer management module (BMG) 166 of the controller 108 detects the workload and state of the DSD 106. Based on the detected workload and/or state of the DSD 106, the BMG 166 maps one of a plurality of buffer memory profiles 170 to the buffer memory 150, modifying the relative sizes of the TRAM 154, XRAM 158, and L2P 162 buffers, and in some embodiments, additional buffers through nRAM 164. This provides additional buffer space to the appropriate buffer (e.g., TRAM 154, XRAM 158, L2P 162, nRAM 164) to increase operational efficiency of the DSD 106 for the then-current workload. Each buffer memory profile 170 in this context contains a different size allocation for the TRAM 154, XRAM 158, and L2P 162, and in some embodiment additional buffers through nRAM 164, that may be assigned to the buffer memory 150 based on a detected workload of the DSD 106.

Example Process

Figure 2:
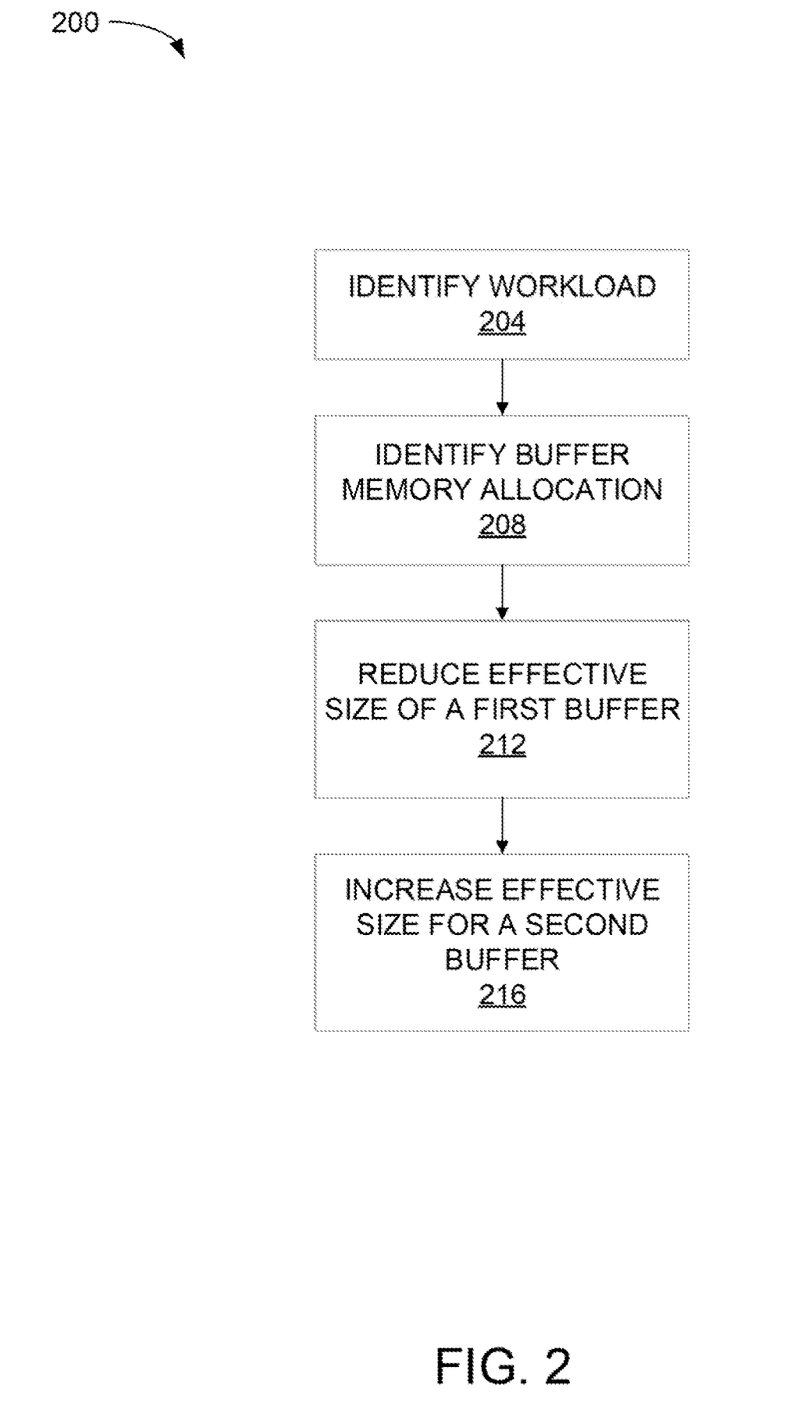
FIG. 2 depicts an example process for dynamic controller buffer management and configuration, according to certain embodiments

FIG. 2 depicts an example process 200 for dynamic controller buffer management and configuration, according to certain embodiments. At block 204, the BMG 166 identifies the current workload of the DSD 106. According to certain embodiments, the workload is identified based on a workload characteristic of the workload, such as a command, or sequence of commands, received from the host device 104. Based on the identified workload, at block 208 the BMG 166 determines an allocation of the buffer memory 150 for each of the TRAM 154, XRAM 158, and L2P 162, and in some embodiment one or more additional buffers such as nRAM 164, to best accommodate the detected workload. According to certain embodiments, determining the allocation may be done via a lookup table, indexed by workloads, with a buffer memory profile 170 correlating to each indexed workload. By way of example, where commands from the host 104 are directed to sequential read operations where logical block addresses are continuous, a profile may be chosen to accelerate RLA. According to certain embodiments, the BMG 166 may modify the buffer memory based on a state of the controller 108, such as, for example, if the controller 108 applies garbage collection to one or more of the non-volatile memory devices 110, or where host data operations are directed to SLC memory (rather than TLC memory) of the non-volatile memory devices 110.

Figure 3A:
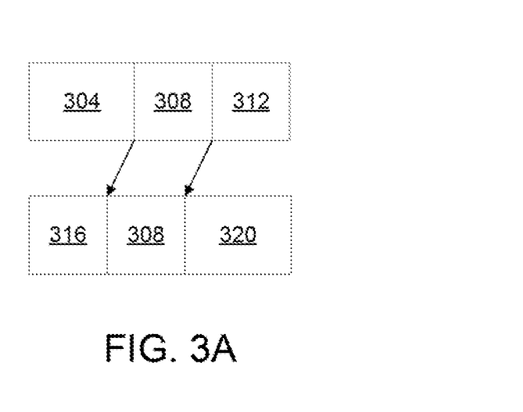
FIGS. 3A, 3B, and 3C depict example embodiments of allocation of buffer memory, according to certain embodiments.
Figure 3B:
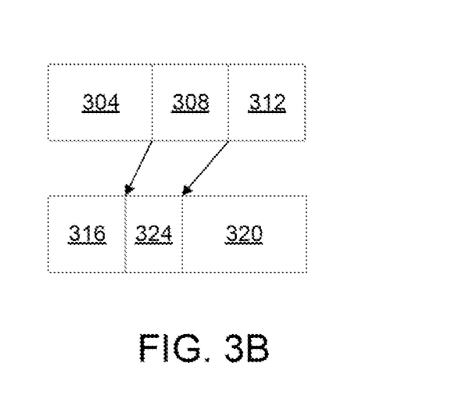
Figure 3C:
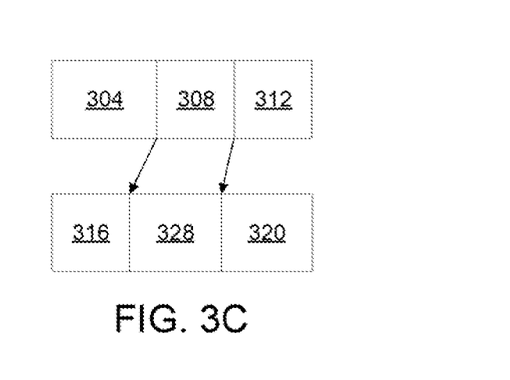

Based on the identified workload, the BMG 166 configures the buffer memory profile 170 to the buffer memory 150, adjusting the relative sizes of two or more of the TRAM 154, XRAM 158, and L2P 162, and in some embodiments one or more additional buffers such as nRAM 164. At block 212, based on the chosen buffer memory profile 170 the effective size of a first buffer of the buffer memory 150 is reduced. The reduced buffer may be any one of the TRAM 154, XRAM 158, or L2P 162, or in some embodiments one or more additional buffers such as nRAM 164. FIGS. 3A, 3B, and 3C depict remapping of buffer memory 150. Each of the first buffer 304, third buffer 308, and second buffer 312 represent one of the TRAM 154, XRAM 158, and L2P 162, as each may be adjusted accordingly based on the desired buffer memory profile 170, which as discussed above, is selected based on the workload of the DSD 106. Although only one buffer is mentioned as being reduced, two buffers may be reduced so as to enable increase in buffer size at block 216. At block 216, the size of a second buffer is increase, at least in part at the expense of the first buffer reduced at block 212. The second buffer that is increased is at least one of the buffers that was not reduced at block 212. Although it is mentioned that one buffer increases, it is understood that in embodiments where one buffer is reduced (e.g., first buffer), the remaining buffers may both be increased, depending on the buffer memory profile 170 selected by the BMG.

FIGS. 3A, 3B, and 3C depict examples of changing buffer sizes, according to certain embodiments. In FIG. 3A, a first buffer 304 is shown to be reduced in size to a first buffer 316 while a second buffer 312 increases in size to second buffer 320, and third buffer 308 remains the same. In FIG. 3B, first buffer 304 reduces in size to first buffer 316, second buffer 312 increases in size to second buffer 320, and third buffer 308 reduces in size to third buffer 324. FIG. 3C depicts buffer 304 reducing in size to first buffer 316, second buffer 312 increases in size to second buffer 320, and third buffer 308 also increases in size to third buffer 328. Each buffer, and concomitant increased/reduced size buffer, are one of the TRAM 154, XRAM 158, and L2P 162, depending on the buffer memory profile selected by the BMG 166; the depicted left-to-right ordering is arbitrary, intended only to show relative sizes, and changes in relative size that is dependent on the buffer memory profile 170 selected.

Figure 4:
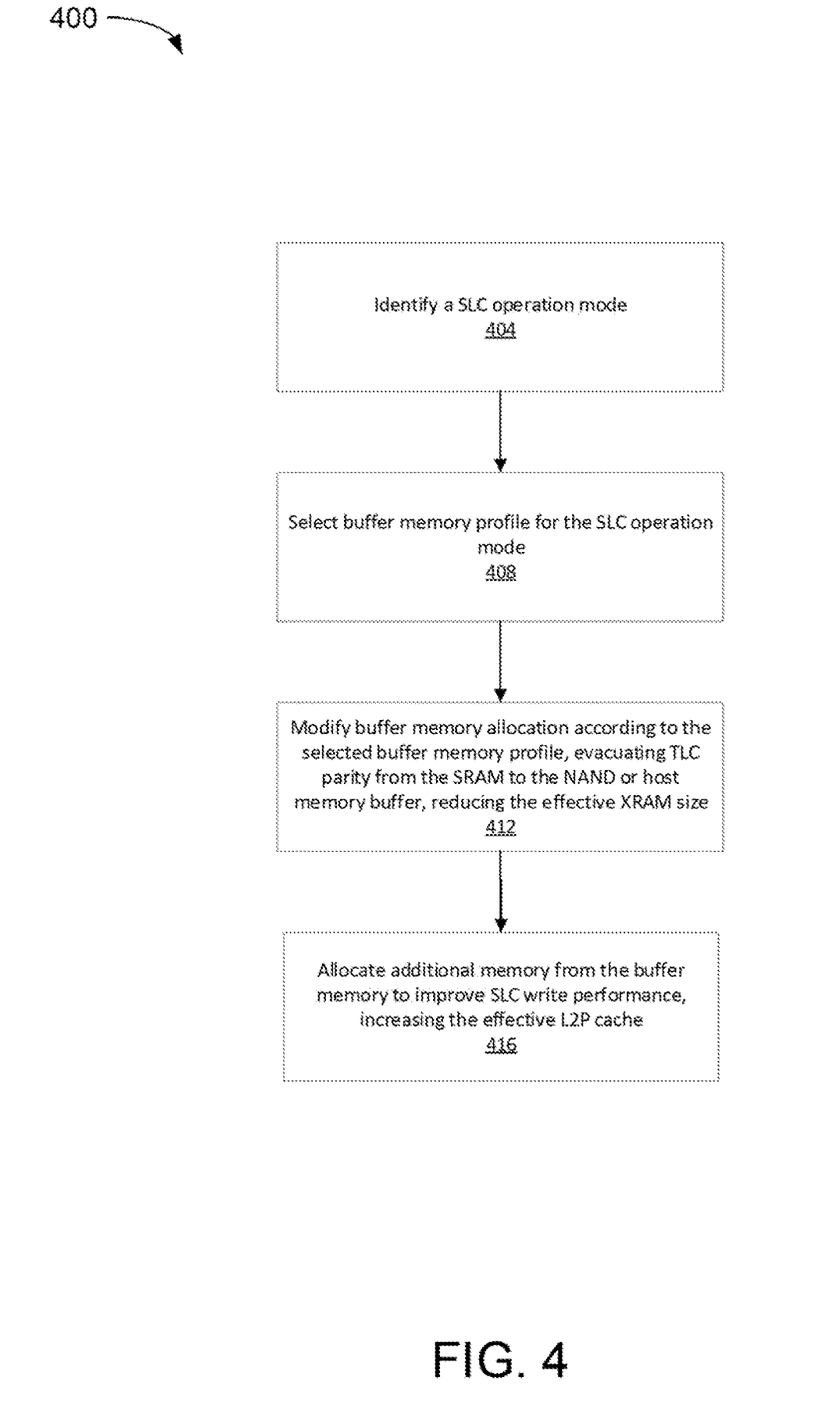
FIG. 4 depicts a process diagram showing an example implementation of dynamic controller buffer management and configuration, according to certain embodiments.

FIG. 4 depicts a process diagram 400 showing an example implementation of dynamic controller buffer management and configuration, according to certain embodiments. At block 404, the BMG 166 identifies that the DSD 106 is in, or will be in, an SLC operation mode. At block 408, the BMG 166 selects a buffer memory profile 170 for the SLC operation mode.

At block 412, the BMG 166 modifies the buffer memory 150 allocation among the TRAM 154, XRAM 158, and L2P 162 in accordance with the selected buffer memory profile 170. The selected buffer memory profile 170 causes the evacuation of TLC parity buffers from the XRAM buffer 158 to the NVM 110, or host DRAM 138. This reduces the effective XRAM 158 size. At block 416, the BMG 166 causes the additional memory freed up in block 412 to be allocated to improve SLC write performance, increasing the effective size of the L2P 162.

Figure 5:
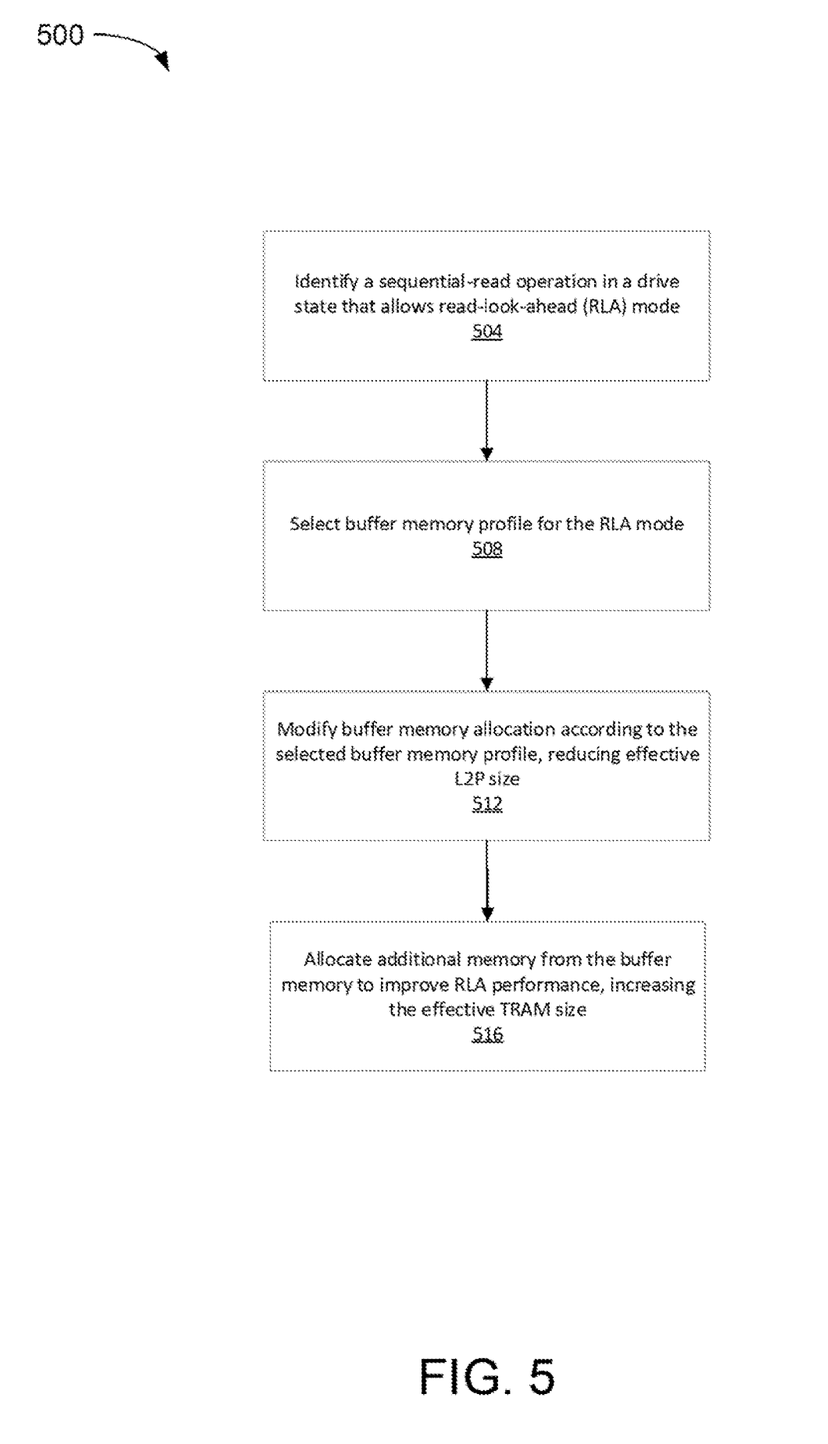
FIG. 5 depicts a process diagram showing an example implementation of dynamic controller buffer management and configuration, according to certain embodiments.

FIG. 5 depicts a process diagram 500 showing an example implementation of dynamic controller buffer management and configuration, according to certain embodiments. At block 504, the BMG 166 identifies that the DSD 106 is in, or will be in, a read-look-ahead (RLA) mode. At block 508, the BMG 166 selects a buffer memory profile 170 for the RLA mode.

At block 512, the BMG 166 modifies the buffer memory 150 allocation among the TRAM 154, XRAM 158, and L2P 162 in accordance with the selected buffer memory profile 170. The selected buffer memory profile 170 causes reduction of L2P 162 buffers of the buffer memory 150, effectively decreasing the effective size of the L2P 162.

At block 516, the selected memory profile 170 causes the additional memory freed up in block 512 to be allocated to improve RLA performance, increasing the effective size of the TRAM 154.

Figure 6:
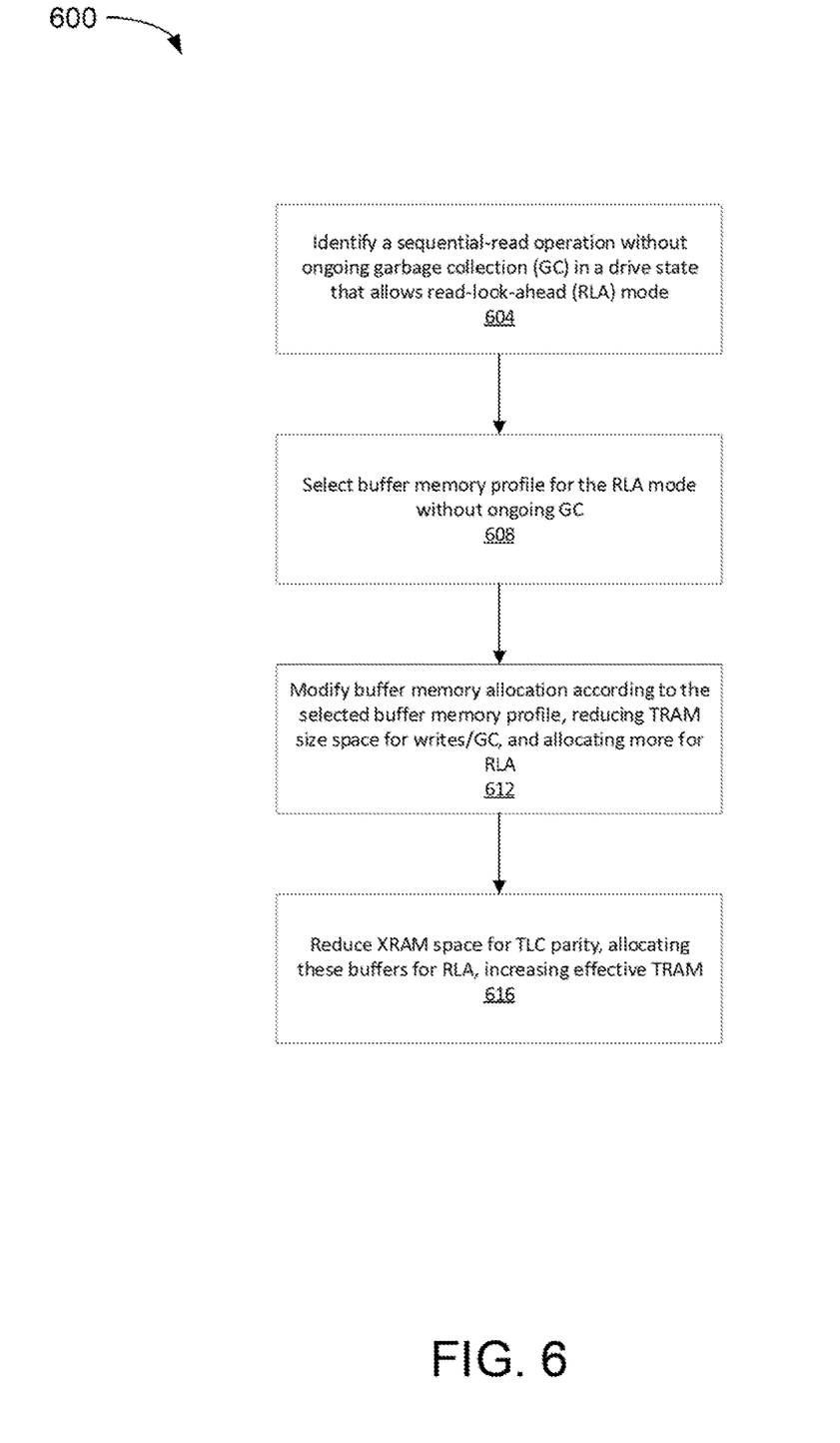
FIG. 6 depicts a process diagram showing an example implementation of dynamic controller buffer management and configuration, according to certain embodiments.

FIG. 6 depicts a process diagram 600 showing an example implementation of dynamic controller buffer management and configuration, according to certain embodiments. At block 604, the BMG 166 identifies that the DSD 106 is in, or will be in, a sequential read operation without ongoing garbage collection (GC), in a drive state that allows RLA mode. At block 608, the BMG 166 selects a buffer memory profile 170 for the RLA mode without ongoing GC.

At block 612, the BMG 166 modifies the buffer memory 150 buffer allocation among the TRAM 154, XRAM 158, and L2P 162 in accordance with the selected buffer memory profile 170. The selected buffer memory profile 170 causes reduction of TRAM 154 size for writes and/or GC, allocating more TRAM 154 size for RLA. At block 616, selected buffer memory profile 170 causes reduction in the XRAM

158 buffer used for TLC parity, causing these buffers to be allocated for RLA, increasing the effective TRAM 154 size.

Figure 7:
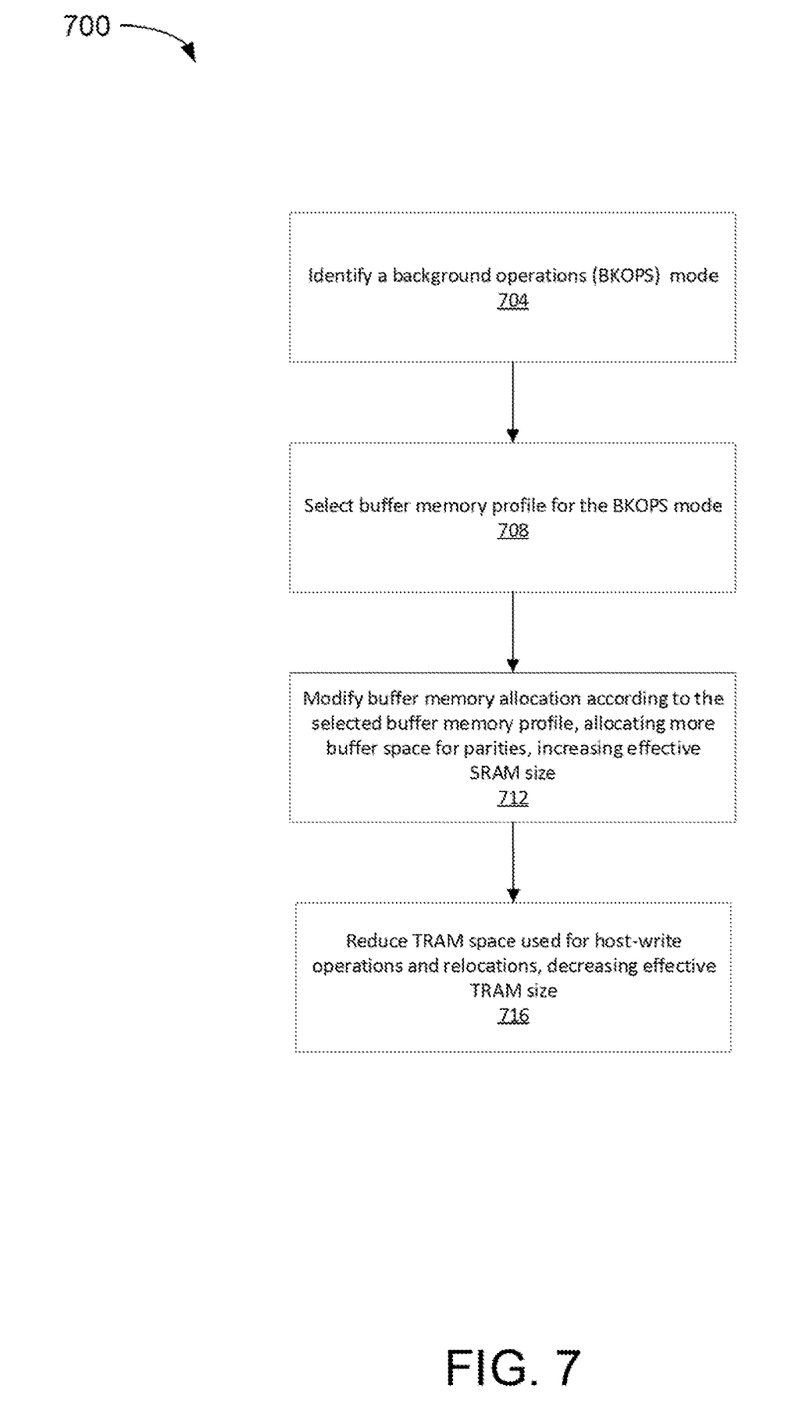
FIG. 7 depicts a process diagram showing an example implementation of dynamic controller buffer management and configuration, according to certain embodiments.

FIG. 7 depicts a process diagram 700 showing an example implementation of dynamic controller buffer management and configuration, according to certain embodiments. At block 704, the BMG 166 identifies that the DSD 106 is in, or will be in, a background operations (BKOPS) mode, such as host-writes or NVM data relocation. At block 708, the BMG 166 selects a buffer memory profile 170 for the BKOPS mode.

At block 712, the BMG 166 causes the buffer memory 150 to modify buffer allocation among the TRAM 154, XRAM 158, and L2P 162 according to the selected buffer memory profile 170. The selected buffer memory profile 170 causes allocation of more buffer space of buffer memory 150 for parities, increasing the effective XRAM 158 size. At block 716, the selected buffer memory profile 170 further causes reduction of TRAM 154 space used for host-write operations and relocations, decreasing the effective TRAM 154 size.

Figure 8:
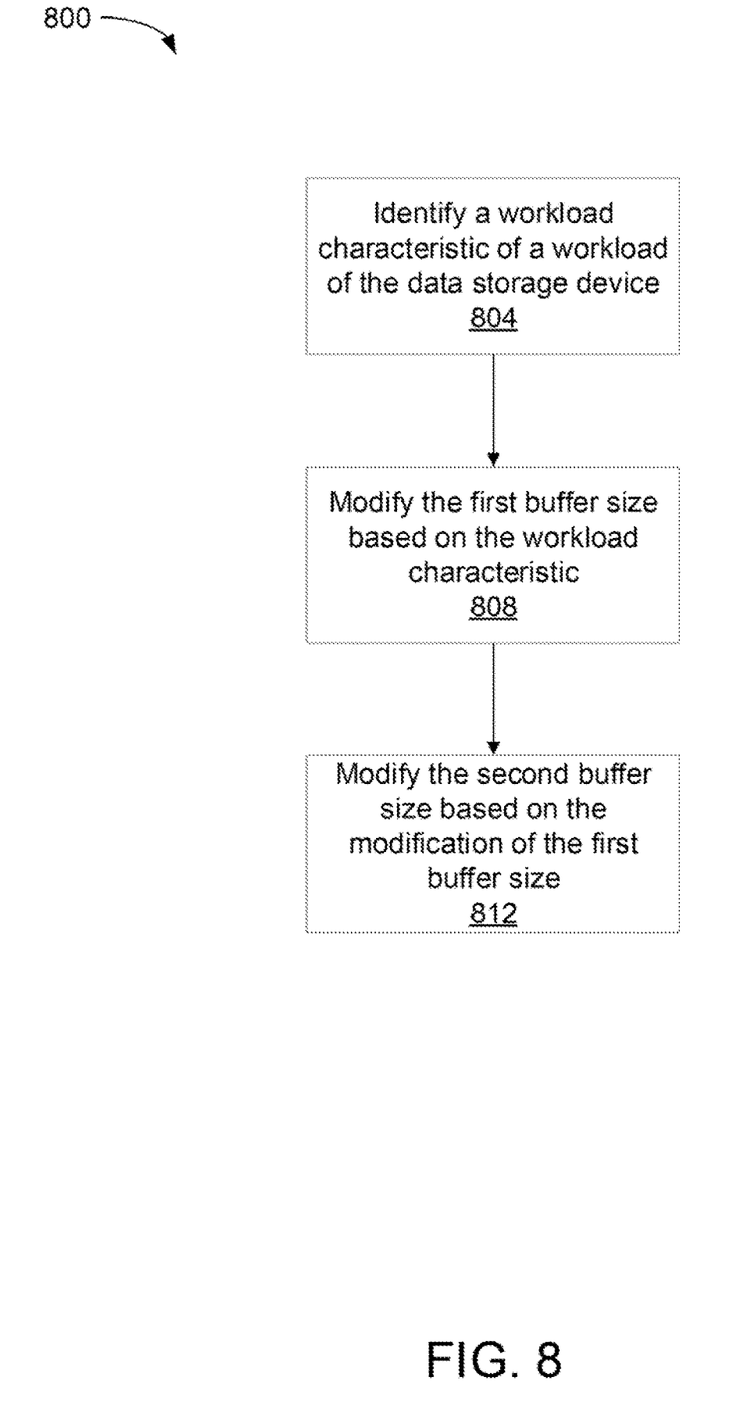
FIG. 8 depicts a method for dynamic controller buffer management and configuration, according to certain embodiments.

FIG. 8 depicts a method 800 for dynamic controller buffer management and configuration, according to certain embodiments. At block 804, the BMG 166 identifies a workload characteristic of a workload of the DSD 106. According to certain embodiments, the workload characteristic is mapped to a buffer memory profile. According to certain embodiments, the buffer memory profile defines the first buffer size, the second buffer size, and the third buffer size. According to certain embodiments, the first buffer size, second buffer size, and third buffer size is based on the buffer memory profile.

At block 808, the first buffer size is modified based on the workload characteristic. According to certain embodiments, the processor is further configured to identify a second workload characteristic and map the second workload characteristic to a second buffer memory profile, and adjusting the first buffer size, second buffer size, and third buffer size is based on the second buffer memory profile.

At block 812, the second buffer size is modified based on the first buffer size.

By providing the DSD 106 with the BMG 166 and buffer memory 150 as disclosed herein, operations of the DSD 106 are dynamically provided with additional buffer memory 150 to improve speed and efficiency of operations.

According to certain embodiments, a data storage device is disclosed comprising a non-volatile memory (NVM) device, and a controller coupled to the NVM device. The controller comprises a buffer memory device comprising a first buffer partition comprising one of a transactional RAM (TRAM) buffer, a logical to physical (L2P) buffer, or a parity RAM (XRAM) buffer, the first buffer partition being of a first buffer size, and a second buffer partition comprising one of a TRAM buffer, an L2P buffer, or an XRAM buffer that is different from the first buffer partition, the of a second buffer partition being of a second buffer size, and a processor coupled to the buffer memory device. The processor is configured to identify a workload characteristic of a workload of the data storage device, modify the first buffer size based on the workload characteristic, and modify the second buffer size based on the modification of the first buffer size. The data storage device, wherein the buffer memory further comprises a third buffer partition comprising one of a TRAM buffer, an L2P buffer, or an XRAM buffer, that is different than the first buffer partition and second buffer partition, the third buffer partition being of a third buffer size, and wherein the processor is further configured to modify the third buffer size based on the workload characteristic and the modification of the first buffer size and the second buffer size. The data storage device wherein the workload characteristic is mapped to a buffer memory profile. The data storage device, wherein the buffer memory profile defines the first buffer size, the second buffer size and the third buffer size. The data storage device wherein modifying the first buffer size, the second buffer size, and the third buffer size is based on the buffer memory profile. The data storage device, wherein the processor is further configured to identify a second workload characteristic and map the second workload characteristic to a second buffer memory profile. The data storage device, further comprising adjusting two of the first buffer size, the second buffer size, and the third buffer size based on the second buffer memory profile.

According to certain embodiments, a controller for a data storage device is disclosed, comprising a buffer memory device comprising a first buffer partition comprising one of a TRAM buffer, an L2P buffer, or an XRAM buffer, the first buffer partition being of a first buffer size, and a second buffer partition comprising one of a TRAM buffer, an L2P buffer, or an XRAM buffer that is different from the first buffer partition, the of a second buffer partition being of a second buffer size, the first buffer size and second buffer size allocated based on a first workload, and a buffer management module (BMG) coupled to the buffer memory, configured to adjust the first buffer size and second buffer size based on a second workload of the data storage device. The controller, wherein the BMG being configured to adjust comprises identifying a workload characteristic of the second workload, modifying the first buffer size, and modifying the second buffer size based on the modification of the first buffer size. The controller, wherein the identified workload characteristic of the second workload is mapped to a buffer memory profile. The controller, wherein the buffer memory profile defines the first buffer size and the second buffer size. The controller, wherein the first buffer size and second buffer size is modified based on the buffer memory profile. The controller, wherein the BMG adjusts the first buffer size and second buffer size based on a third workload that is mapped to a second buffer memory profile. The controller, wherein the buffer memory further comprises a third buffer partition comprising one of a TRAM buffer, an L2P buffer, or an XRAM buffer, that is different than the first buffer partition and second buffer partition, the third buffer partition being of a third buffer size, and wherein the BMG adjusts the third buffer size based on the second workload. The controller, wherein the first buffer partition comprises a TRAM buffer, the second buffer partition comprises an XRAM buffer, and the third buffer partition comprises an L2P buffer.

According to certain embodiments, a data storage device is disclosed, comprising one or more non-volatile memory (NVM) means, and a controller comprising computer-readable instructions. The computer-readable instructions cause the controller to identify a workload characteristic of a workload of the data storage device, remove a first data type from a first buffer partition of a buffer memory means based on the workload characteristic, modify a first buffer size, and modify a second buffer size of a second buffer partition of the buffer memory means, based on the modification of the first buffer size. The data storage device, wherein the workload characteristic is mapped to a buffer memory profile. The data storage device, wherein the buffer memory profile defines the first buffer size and the second buffer size. The data storage device, wherein modifying the first buffer size and second buffer size is based on the buffer memory profile. The data storage device, wherein the computer-readable instructions further cause the controller to identify a second workload characteristic of a second workload, mapping the second workload characteristic to a second buffer memory profile, and modifying the first buffer size and second buffer size based on the second buffer memory profile.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a non-volatile memory (NVM) device; and
a controller coupled to the NVM device, the controller comprising:
a buffer memory device comprising a first buffer partition, the first buffer partition being of a first buffer size, and a second buffer partition that is different from the first buffer partition, the of a second buffer partition being of a second buffer size, wherein the first buffer partition comprises one of a transactional random access memory (TRAM) buffer, a logical to physical cache (L2P) buffer, or a parity random access memory (XRAM) buffer, wherein the second buffer partition comprises one of a TRAM buffer, an L2P buffer, or an XRAM buffer that is different from the first buffer partition, wherein the buffer memory device is a contiguous physical memory space, wherein a TRAM buffer is a holding buffer for write operations and relocation operations, wherein an L2P buffer is buffer space for storing parts of a logical to physical table mapping logical location references to physical locations on the NVM device, and wherein an XRAM buffer is configured to hold parity data accumulated for different pages of each open block of the NVM device; and
a processor coupled to the buffer memory device, the processor configured to:
identify a workload characteristic of a workload of the data storage device;
modify the first buffer size based on the workload characteristic; and
modify the second buffer size based on the modification of the first buffer size.

2. The data storage device of claim 1, wherein the buffer memory further comprises a third buffer partition, that is different than the first buffer partition and second buffer partition, the third buffer partition being of a third buffer size, and wherein the processor is further configured to modify the third buffer size based on the workload characteristic and the modification of the first buffer size and the second buffer size.

3. The data storage device of claim 2, wherein the workload characteristic is mapped to a buffer memory profile.

4. The data storage device of claim 3, wherein the buffer memory profile defines the first buffer size, the second buffer size and the third buffer size.

5. The data storage device of claim 4, wherein modifying the first buffer size, the second buffer size, and the third buffer size is based on the buffer memory profile.

6. The data storage device of claim 5, wherein the processor is further configured to identify a second workload characteristic and map the second workload characteristic to a second buffer memory profile.

7. A controller for a data storage device, comprising:
a buffer memory device comprising a first buffer partition comprising one of a transactional random access memory (TRAM) buffer, a logical to physical cache (L2P) buffer, or a parity random access memory (XRAM) buffer, the first buffer partition being of a first buffer size, and a second buffer partition comprising one of a TRAM buffer, an L2P buffer, or an XRAM buffer that is different from the first buffer partition, the of a second buffer partition being of a second buffer size, the first buffer size and second buffer size allocated based on a first workload, wherein the buffer memory device is a contiguous physical memory space, wherein a TRAM buffer is a holding buffer for write operations and relocation operations, wherein an L2P buffer is buffer space for storing parts of a logical to physical table mapping logical location references to physical locations on the NVM device, and wherein an XRAM buffer is configured to hold parity data accumulated for different pages of each open block of the NVM device; and
a buffer management module (BMG) coupled to the buffer memory, configured to adjust the first buffer size and second buffer size based on a second workload of the data storage device.

8. The controller of claim 7, wherein the BMG being configured to adjust comprises:
identifying a workload characteristic of the second workload;
modifying the first buffer size; and
modifying the second buffer size based on the modification of the first buffer size.

9. The controller of claim 8, wherein the identified workload characteristic of the second workload is mapped to a buffer memory profile.

10. The controller of claim 9, wherein the buffer memory profile defines the first buffer size and the second buffer size.

11. The controller of claim 10, wherein the first buffer size and second buffer size is modified based on the buffer memory profile.

12. The controller of claim 11, wherein the BMG adjusts the first buffer size and second buffer size based on a third workload that is mapped to a second buffer memory profile.

13. The controller of claim 10, wherein the buffer memory further comprises a third buffer partition comprising one of a TRAM buffer, an L2P buffer, or an XRAM buffer, that is different than the first buffer partition and second buffer partition, the third buffer partition being of a third buffer size, and wherein the BMG adjusts the third buffer size based on the second workload.

14. The controller of claim 13, wherein the first buffer partition comprises a TRAM buffer, the second buffer partition comprises an XRAM buffer, and the third buffer partition comprises an L2P buffer.

15. A data storage device, comprising:
one or more non-volatile memory (NVM) means; and
a controller comprising computer-readable instructions that cause the controller to:
identify a workload characteristic of a workload of the data storage device;
remove a first data type from a first buffer partition of a buffer memory means based on the workload characteristic;
modify a first buffer size; and
modify a second buffer size of a second buffer partition of the buffer memory means, based on the modification of the first buffer size, wherein the first buffer partition comprises one of a transactional random access memory (TRAM) buffer, a logical to physical cache (L2P) buffer, or a parity random access memory (XRAM) buffer, wherein the second buffer partition comprises one of a TRAM buffer, an L2P buffer, or an XRAM buffer that is different from the first buffer partition, wherein the buffer memory device is a contiguous physical memory space, wherein a TRAM buffer is a holding buffer for write operations and relocation operations, wherein an L2P buffer is buffer space for storing parts of a logical to physical table mapping logical location references to physical locations on the NVM device, and wherein an XRAM buffer is configured to hold parity data accumulated for different pages of each open block of the NVM device.

16. The data storage device of claim 15, wherein the workload characteristic is mapped to a buffer memory profile.

17. The data storage device of claim 16, wherein the buffer memory profile defines the first buffer size and the second buffer size.

18. The data storage device of claim 17, wherein modifying the first buffer size and second buffer size is based on the buffer memory profile.

19. The data storage device of claim 18, wherein the computer-readable instructions further cause the controller to identify a second workload characteristic of a second workload, mapping the second workload characteristic to a second buffer memory profile, and modifying the first buffer size and second buffer size based on the second buffer memory profile.

20. The data storage device of 16, wherein the TRAM buffer is managed in 4 KB increments.

* * * * *